(12) United States Patent
Herberth et al.

(10) Patent No.: US 7,757,297 B2
(45) Date of Patent: Jul. 13, 2010

(54) SYSTEM FOR THE STORAGE AND RETRIEVAL OF CONFIDENTIAL INFORMATION

(75) Inventors: Harald Herberth, Oberasbach (DE); Ronald Lange, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 1126 days.

(21) Appl. No.: 11/404,030

(22) Filed: Apr. 13, 2006

(65) Prior Publication Data

US 2007/0174607 A1  Jul. 26, 2007

(30) Foreign Application Priority Data

Apr. 22, 2005  (EP)  ................... 05008918

(51) Int. Cl.
  *G06F 7/04* (2006.01)
(52) U.S. Cl. .......................................... 726/28
(58) Field of Classification Search .................. None
  See application file for complete search history.

(56) References Cited

U.S. PATENT DOCUMENTS

| 5,787,175 | A | 7/1998 | Carter | |
| 6,178,508 | B1 | 1/2001 | Kaufman | |
| 6,741,705 | B1 * | 5/2004 | Nelson et al. | 380/257 |
| 2002/0169973 | A1 | 11/2002 | Kim et al. | |
| 2006/0184786 | A1 * | 8/2006 | Sandhu et al. | 713/155 |

FOREIGN PATENT DOCUMENTS

GB  2 389 929 A  12/2003

* cited by examiner

*Primary Examiner*—Brandon S Hoffman

(57) ABSTRACT

The invention relates to a system and a method for the storage and/or retrieval of confidential information for at least one user, by means of which a secret, in particular a project password, can be securely retrieved again. System for the storage and/or retrieval of confidential information for at least one user, particularly within the area of creating a project, with first means for encryption of the confidential information using a public key of an asymmetric method through a key service and for storage of the encrypted information in a generally accessible memory and at least one input device for entry of the private key associated with the public key through the key service for the retrieval of the information, whereby the system includes a selection device for the selection of at least one key service by the at least one user.

14 Claims, 1 Drawing Sheet

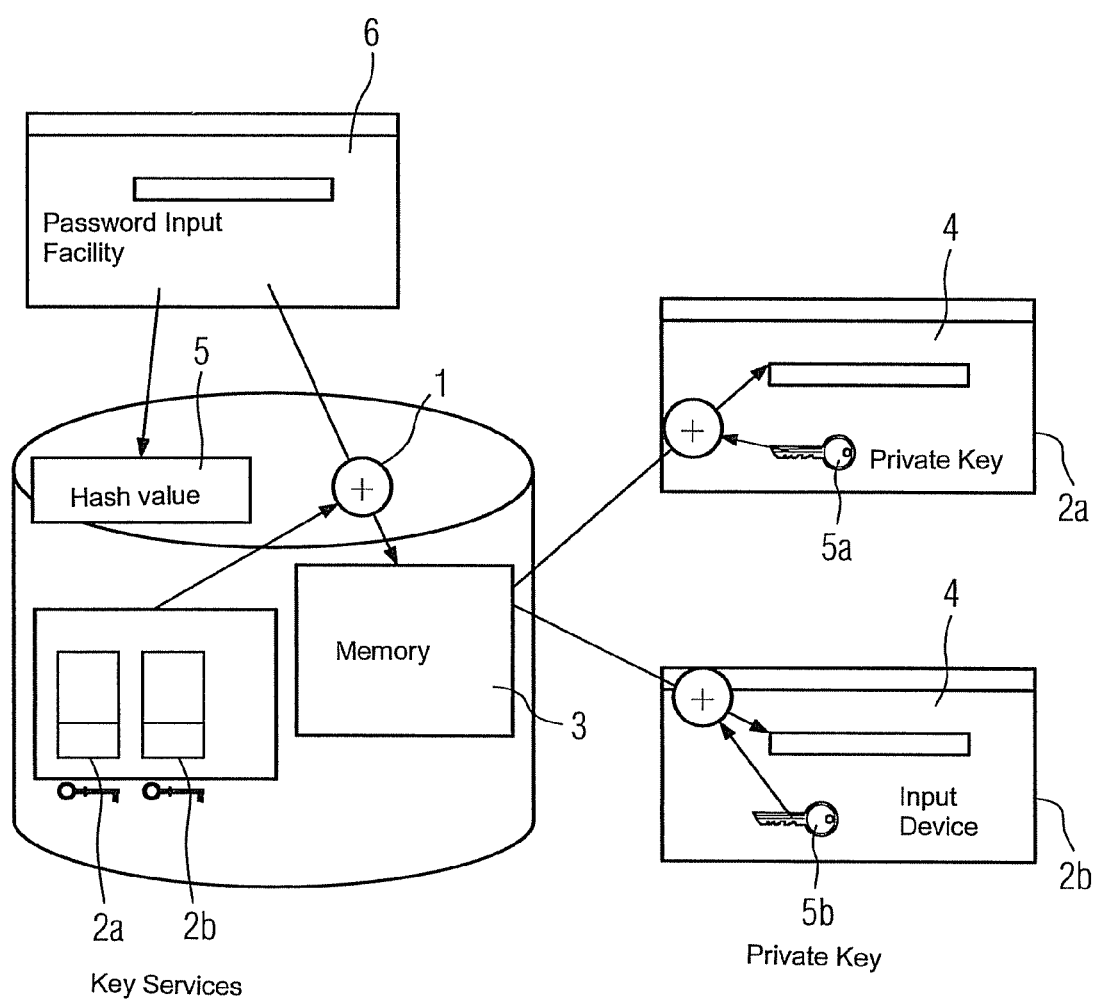

SYSTEM FOR THE STORAGE AND RETRIEVAL OF CONFIDENTIAL INFORMATION

CROSS REFERENCE TO RELATED APPLICATIONS

This application claims priority to the European Application No. 05008918.4, filed Apr. 22, 2005 which is incorporated by reference herein in its entirety.

FIELD OF INVENTION

The invention relates to a system and a method for the storage and/or retrieval of confidential information for at least one user.

BACKGROUND OF INVENTION

The invention relates to all those applications in which a common secret needs to be securely stored, but whereby compensation nevertheless needs to be effected in a secure manner in the event of loss of the secret. With regard to the secret, this can for example be a password. Resetting of the password in the event of a lost password should not be permitted.

Within the scope of the automation of industrial systems in particular this can relate to a project password or to the protection of know-how (concerning software modules for a stored program controller, for example). In this situation, the object to be protected can likewise be secured by means of a password.

Furthermore, within the scope of FDA there is frequently a requirement for passwords to be stored not openly but by being dealt with cryptographically. The difficulty with the retrieval of the secret or of the password thus also presents itself in this environment.

In general, the invention thus relates to systems which store a password in a cryptographically secure form (the hash value of a password, for example). These systems are as a rule not in a position to be able to output the password if the user has forgotten the password.

SUMMARY OF INVENTION

A concrete requirement within the scope of project management of an automation solution consists in the fact that, amongst other things, a project password is defined within the framework of access protection during project management. The project password can be specified at the time when the project is created. The project password can be changed at a later time. Anyone who knows the project password is able to reconfigure the user administration and thus promote themselves to administrator. The project password is thus a critical secret and is stored accordingly by means of cryptographic mechanisms. If the project password is forgotten, however, it may no longer be possible to use the project under certain circumstances (in other words, when moving into a different user environment).

Thus far the problem has been solved to the effect that the password is noted and stored in a suitable form such that it can be found again if it is lost.

A further solution consists in the fact that the password can be reset to a new value by a system administrator, whereby however the original password is then lost forever. This is also usual in the methods based on passwords. Here the passwords are handled by means of a cryptographic hash function. Subsequently it is not the password but only the hash value which is stored although in these systems the password can be deleted at any time by an administrator and initialized with a new password. This behavior is however not acceptable with regard to the protection of know-how and in the area of passport usage in the automation environment since it represents a security loophole.

An object of the present invention is therefore to set down a system and a method by means of which a secret, in particular a project password, can be securely retrieved again.

This object is achieved by a system for the storage and/or retrieval of confidential information for at least one user, particularly within the scope of creating a project, with first means for encryption of the confidential information using a public key of an asymmetric method through a key service and for storage of the encrypted information in a generally accessible memory and at least one input device for entry of the private key associated with the public key through the key service for the retrieval of the information, whereby the system includes a selection device for the selection of at least one key service by the at least one user.

This object is further achieved by a method for the storage and/or retrieval of confidential information for at least one user, particularly within the scope of creating a project, in which confidential information is encrypted using a public key of an asymmetric method through a key service and the encrypted information is stored in a generally accessible memory and the private key associated with the public key through the key service is entered for the retrieval of the information, with at least one key service being selected by at least one user.

The invention is based on the knowledge that a password or another item of encrypted information can be securely retrieved if it is encrypted using a public key and can subsequently be decrypted again through a selectable key service using the associated private key.

Within the framework of the invention the information to be encrypted, the project password for example, is additionally encrypted with one or more public keys of an asymmetric method in the case of the first input and each following change. The encryption by means of a plurality of public keys is performed if a plurality of key services is intended to be used for retrieval of the information in order that one is always available. This encrypted information is also stored in the project data. The owner of the private key, the key service for example, is thus in a position to retrieve the project password from the project data, whereas it continues to represent an unavailable item of information for anyone else.

In this situation it is particularly advantageous that the operator of the key service, who makes use of the private key and is able to retrieve the encrypted information, can be selected by the user, the creator of the automation project for example. This is achieved by the fact that the user can specify during creation of the project for example whether he would like to have a key service for the project password and who the operator of the key service should be. The latter happens for example through the specification of a certificate for the corresponding key service. In this situation, it is also possible for example for more than one certificate for a plurality of key services to be specified by the user. By this means it is possible to implement a plurality of parallel key services such that the user can guarantee to have access to at least one of the available key services in the event of an emergency.

When software is shipped to the user for example, the software manufacturer's certificate is enclosed as standard. Users who are unable to accept the software manufacturer's certificate from their understanding of the security situation can import a separate certificate and thus select a key service other than the original manufacturer of the software for the purposes of decryption.

In addition, the software contains a tool which can determine for a project whether one or more key services are configured, who the operator of the corresponding key service is (the owner, the identity of the certificate). If the tool is also provided with the appropriate private key, this tool is also capable of retrieving and displaying the project password.

The invention can also be used for protecting the know-how of objects, for modules for stored program controllers for example, as well as for the encryption of passwords.

The particular advantage of the invention consists in the fact that secret information, for example a password, can be retrieved again in a secure manner without allowing the password to be reset or requiring that the password be reset. The invention thus offers an enormous advantage in terms of security. In addition, the invention allows the user to select whether a key service will be provided at all for an object to be protected or a password, and by whom the key service will be operated. Furthermore, the selection of a plurality of key services is possible for decryption of the password. In this manner, both the manufacturer of the project management software and also other services can provide the user with an attractive range of services.

BRIEF DESCRIPTION OF THE DRAWING

The invention is described and explained in more detail below with reference to the FIGURE. The FIGURE depicts a schematic view of a suggested storage and retrieval system.

DETAILED DESCRIPTION OF INVENTION

FIG. 1 shows the system for the storage and/or retrieval of confidential information for at least one user. In this situation, a password is entered by the user by way of a password input facility 6. The password is encrypted in the form of a hash value and stored in the project data. A memory 3 is made available for this purpose. The password is encrypted with the aid of an asymmetric method by the encryption medium 1. The encrypted password is likewise stored in the memory 3. The encryption is carried out by key services 2a, 2b. In this situation the key services can be selected by the user. The retrieval of the password or of the secret information takes place through the private keys 5a, 5b of the key services 2a, 2b. In this situation, the private key 5a, 5b associated with the public key is entered by the key services 2a, 2b by way of the input device 4. The key services 2a, 2b can be selected by the user by way of certificates associated with them. The user can select one or more key services for the management or retrieval of the confidential information.

The invention claimed is:

1. A system for storing and retrieving confidential information for at least one user, comprising:
    a first encryption mechanism for encrypting confidential information by a plurality of parallel encryption key services using public keys of an asymmetric encryption method and for storing the encrypted information in a public domain memory;
    at least one input device for entering a private key associated with the public keys by one of the encryption key services for retrieving the confidential information; and
    a selection device for selecting the encryption key services from a plurality of encryption key services, such that it is guaranteed to have access to at least one of the encryption key services in the event of an emergency.

2. The system according to claim 1, further comprising a second encryption mechanism for encrypting the confidential information and for storing the encrypted confidential information, wherein the second encryption mechanism is configured to encrypt the confidential information one-way such that the encrypted confidential information can only be retrieved or reset using the encryption key service.

3. The system according to claim 2, wherein the second encryption mechanism is configured to calculate a Hash-value from the confidential information.

4. The system according to claim 1, wherein the public domain memory holds project data, the project data including the encrypted confidential information.

5. The system according to claim 1, wherein the selection device is configured to issue a plurality of certificates for the plurality of encryption key services.

6. The system according to claim 1, further comprising a software application for determining such encryption key services or certificates used in a specific project, the specific project represented by project data stored in the public domain memory.

7. The system according to claim 6, wherein the software application is programmed and configured to retrieve the encrypted confidential information, wherein the encrypted confidential information are extracted and decrypted from the project data using the private key.

8. A method for storing and retrieving confidential information for at least one user, comprising:
    encrypting confidential information by a plurality of parallel encryption key services using public keys of an asymmetric method;
    storing the encrypted confidential information in a public domain memory;
    selecting the key services from a plurality of encryption key services by the user, such that it is guaranteed to have access to at least one of the key services in the event of an emergency; and
    entering a private key associated with the public keys by one of the selected key services for retrieving of the information.

9. The method according to claim 8, wherein encrypting the confidential information includes calculating a Hash-value from the confidential information.

10. The method according to claim 9, wherein the confidential information are encrypted one-way such that the encrypted confidential information cannot be decrypted or reset without using the selected encryption key service.

11. The method according to claim 8, wherein the encrypted confidential information are included in project data stored in the public domain memory.

12. The method according to claim 8, wherein a plurality of certificates are issued for the plurality of encryption key services.

13. The method according to claim 8, further comprising determining such encryption key services or certificates used in a specific project, the specific project represented by project data stored in the public domain memory, by a software application.

14. The method according to claim 13, wherein the software application is programmed and configured to retrieve the encrypted confidential information, wherein the encrypted confidential information are extracted and decrypted from the project data using the private key.

* * * * *